(12) United States Patent
Liao et al.

(10) Patent No.: US 12,501,010 B2
(45) Date of Patent: Dec. 16, 2025

(54) DISPLAY SYSTEM, DISPLAY APPARATUS, AND CONTROL METHOD THEREOF

(71) Applicant: Coretronic Corporation, Hsin-Chu (TW)

(72) Inventors: Yi-Jun Liao, Hsin-Chu (TW); Kun-Hong Chen, Hsin-Chu (TW); Yu-Hsuan Hsieh, Hsin-Chu (TW); Yun-Shih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/953,120

(22) Filed: Nov. 20, 2024

(65) Prior Publication Data
US 2025/0168305 A1 May 22, 2025

(30) Foreign Application Priority Data

Nov. 21, 2023 (CN) .......................... 202311557687.4

(51) Int. Cl.
*H04N 9/31* (2006.01)
*G06T 5/60* (2024.01)
*G06T 5/92* (2024.01)

(52) U.S. Cl.
CPC ............. *H04N 9/3194* (2013.01); *G06T 5/60* (2024.01); *G06T 5/92* (2024.01); *H04N 9/3182* (2013.01);
(Continued)

(58) Field of Classification Search
CPC ...... H04N 9/31; H04N 9/3194; H04N 9/3182; G06T 5/60; G06T 5/92; G06T 2200/16; G06T 2200/24; G06T 2207/10016
(Continued)

(56) References Cited

U.S. PATENT DOCUMENTS 11,100,926 B2  8/2021  Lin et al.
11,206,372 B1  12/2021  Zhang
(Continued)

FOREIGN PATENT DOCUMENTS

CN  106412469  2/2017
CN  107205075  9/2017
(Continued)

OTHER PUBLICATIONS

Hsin-Ya Lai et al., "Projection System, Terminal Device, Projection Device and Control Method Thereof", Unpublished U.S. Appl. No. 18/784,932, filed Jul. 26, 2024.
(Continued)

*Primary Examiner* — Trang U Tran
(74) *Attorney, Agent, or Firm* — JCIPRNET (57) ABSTRACT

A display system, a display apparatus, and a control method thereof are provided. The display apparatus executes one of a first process and a second process to obtain an input image file. An artificial intelligence model is configured to generate a standard instruction according to the input image file. The display apparatus adjusts an operating setting of the display apparatus according to the standard instruction. The first process includes: obtaining a first original image file related to an environment of the display apparatus by driving an imaging apparatus, and using the first original image file as the input image file. The second process includes: capturing a multimedia content of the display apparatus by driving an image processing module to obtain a second original image file, and using the second original image file as the input image file.

17 Claims, 5 Drawing Sheets

(52) U.S. Cl.
CPC ...... *G06T 2200/16* (2013.01); *G06T 2200/24* (2013.01); *G06T 2207/10016* (2013.01)

(58) Field of Classification Search
USPC ........................................................ 348/602
See application file for complete search history.

(56) References Cited

U.S. PATENT DOCUMENTS

| | | | |
|---|---|---|---|
| 11,380,117 B1 * | 7/2022 | Zagaynov | G06F 18/21 |
| 11,823,362 B2 * | 11/2023 | Park | G06T 9/002 |
| 12,118,916 B2 * | 10/2024 | Yang | H04N 21/44 |
| 12,175,060 B2 * | 12/2024 | Seo | G06N 3/045 |
| 12,223,334 B2 * | 2/2025 | Lee | G06F 9/44505 |
| 2019/0132436 A1 | 5/2019 | Jang et al. | |
| 2020/0013371 A1 | 1/2020 | Yang et al. | |
| 2023/0033245 A1 | 2/2023 | Sanders et al. | |
| 2023/0042639 A1 | 2/2023 | Goodsitt et al. | |

FOREIGN PATENT DOCUMENTS

| | | |
|---|---|---|
| CN | 108319171 | 7/2018 |
| CN | 108496343 | 9/2018 |
| CN | 110808041 | 2/2020 |
| CN | 116203853 | 6/2023 |
| CN | 117079313 | 11/2023 |
| JP | 2022112292 | 8/2022 |
| KR | 20140037519 | 3/2014 |
| TW | 202013141 | 4/2020 |
| TW | 202102007 | 1/2021 |
| WO | 2019010650 | 1/2019 |

OTHER PUBLICATIONS

"Search Report of Europe Related Application, Application No. 24190662.7", issued on Dec. 13, 2024, p. 1-p. 11.
"Office Action of Japan Related Application, Application No. 2024122331", issued on Jun. 24, 2025, p. 1-p. 6.
"Search Report of Europe Counterpart Application", issued on Mar. 21, 2025, p. 1-p. 12.

* cited by examiner

DISPLAY SYSTEM, DISPLAY APPARATUS, AND CONTROL METHOD THEREOF

CROSS-REFERENCE TO RELATED APPLICATION

This application claims the priority benefit of China application serial no. 202311557687.4, filed on Nov. 21, 2023. The entirety of the above-mentioned patent application is hereby incorporated by reference herein and made a part of this specification.

BACKGROUND

Technical Field

The disclosure relates to a display technology, and in particular to a display system, a display apparatus, and a control method thereof.

Description of Related Art

Generally, a control method of a display apparatus (such as a projector) is mostly performed by the user manually operating a remote control of the display apparatus or operating a human-machine interface on the display apparatus. Therefore, the traditional control method of the display apparatus is quite inconvenient.

The user needs to have relevant knowledge of the display apparatus. For example, when adjusting the functions of the display apparatus by the remote control, the user needs to learn the meanings of the items on the menu of the display apparatus and how to adjust the operating setting of the display apparatus according to a usage scenario, and the user needs to manually adjust the operating setting of the display apparatus. Therefore, the method of adjusting the operating setting of the existing display apparatus is inconvenient.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display system, a display apparatus, and a control method thereof, which can automatically adjust an operating setting of the display apparatus according to an environment or a multimedia content of the display apparatus.

Other objectives, features and advantages of the disclosure will be further understood from the further technological features disclosed by the embodiments of the disclosure where there are shown and described preferred embodiments of this invention, simply by way of illustration of modes best suited to carry out the invention.

In order to achieve one, part, or all of the above purposes or other purposes, a control method of a display apparatus of the disclosure includes: executing one of a first process and a second process by the display apparatus to obtain an input image file; generating a standard instruction by an artificial intelligence model according to the input image file; and adjusting an operating setting of the display apparatus by the display apparatus according to the standard instruction. Here, the first process includes: obtaining a first original image file related to an environment of the display apparatus by driving an imaging apparatus, and using the first original image file as the input image file. The second process includes: capturing a multimedia content of the display apparatus by driving an image processing module to obtain a second original image file, and using the second original image file as the input image file.

In order to achieve one, part, or all of the above purposes or other purposes, a display system of the disclosure includes an imaging apparatus, a display apparatus, and an artificial intelligence model. The imaging apparatus is configured to obtain a first original image file related to an environment of the display apparatus. The display apparatus is coupled to the artificial intelligence model, and the display apparatus includes: an image processing module configured to capture a multimedia content of the display apparatus to obtain a second original image file; and a processor coupled to the imaging apparatus and the image processing module. The processor is configured to use the first original image file from the imaging apparatus or the second original image file from the image processing module as an input image file, and adjust an operating setting of the display apparatus according to a standard instruction from the artificial intelligence model. The artificial intelligence model is configured to generate the standard instruction according to the input image file.

In order to achieve one, part, or all of the above purposes or other purposes, a display apparatus of the disclosure includes: an imaging apparatus configured to obtain a first original image file related to an environment of the display apparatus; an image processing module configured to capture a multimedia content of the display apparatus to obtain a second original image file; and a processor coupled to the imaging apparatus and the image processing module. The processor is configured to use the first original image file from the imaging apparatus or the second original image file from the image processing module as an input image file, and adjust an operating setting of the display apparatus according to a standard instruction corresponding to the input image file.

Based on the above, the display system, the display apparatus, and the control method thereof of the disclosure may parse the input image file to deduce the current environment of the display apparatus or the multimedia content of the display apparatus, thereby allowing the display apparatus to automatically adjust the operating setting to comply with a usage scenario of the display apparatus. Therefore, the viewing experience of the user may be improved.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "left," "right," "front," "back," etc., is used with reference to the orientation of the Figure(s) being described. The components of the disclosure can be positioned in a number of different orientations. As such, the directional terminology is used for purposes of illustration and is in no way limiting.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof are used broadly and encompass direct and indirect connections, couplings, and mountings herein.

Figure 1:
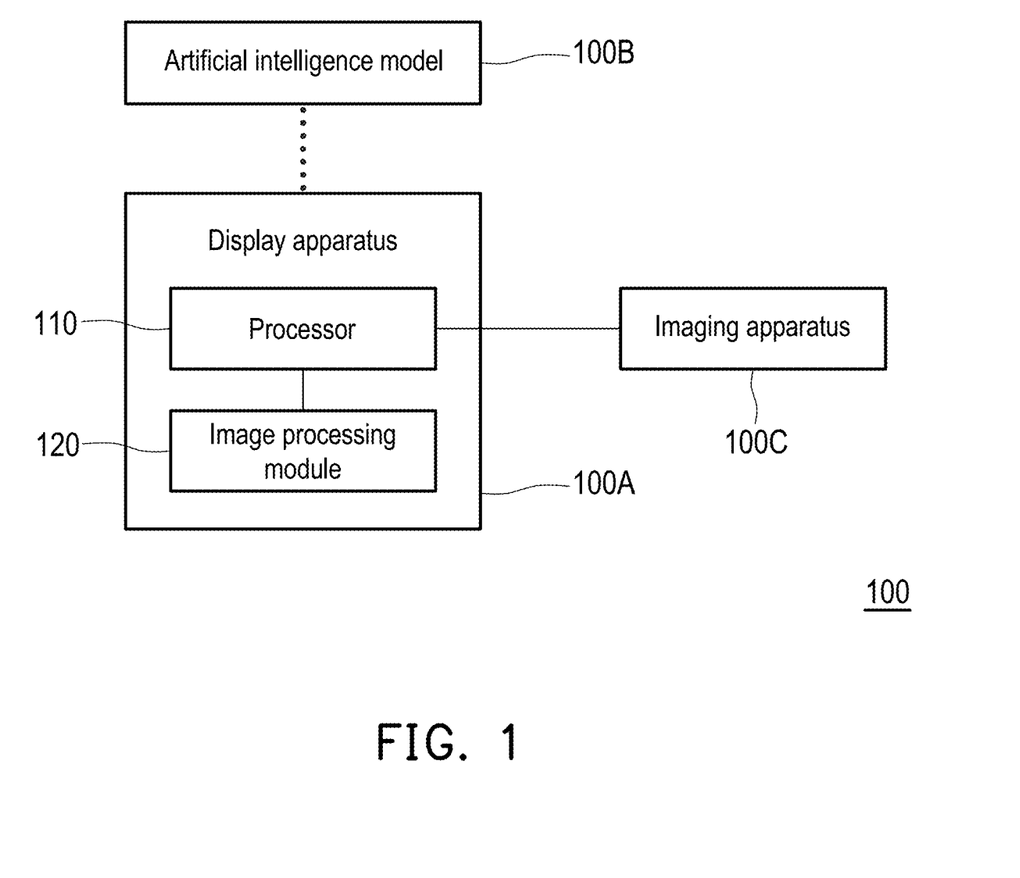
FIG. 1 is a schematic diagram of a display system according to an embodiment of the disclosure.

FIG. 1 is a schematic diagram of a display system according to an embodiment of the disclosure. Referring to FIG. 1, a display system 100 includes a display apparatus 100A, an artificial intelligence model 100B, and an imaging apparatus 100C. The display apparatus 100A, the artificial intelligence model 100B, and the imaging apparatus 100C communicate in wired and/or wireless communication manners.

In this embodiment, the display apparatus 100A is, for example, a display such as a projector, an interactive flat panel (IFP) display, or a touch display. The display apparatus 100A includes a processor 110 and an image processing module 120. The processor 110 is coupled to the image processing module 120.

The processor 110 is, for example, a central processing unit (CPU), a physical processing unit (PPU), a programmable microprocessor, an embedded control chip, a digital signal processor (DSP), an application specific integrated circuits (ASIC), or other similar apparatuses.

The image processing module 120 may be implemented by actual hardware such as a graphics processor unit (GPU). In other embodiments, the image processing module 120 may also be composed of one or multiple program code snippets, stored in a storage and executed by the processor 110. The number of processors 110 may be one or multiple.

The display apparatus 100A further includes the storage. The storage may adopt a fixed or removable random access memory (RAM), a read-only memory (ROM), a flash memory, a hard disk drive in any form, other similar apparatuses, or a combination of the apparatuses. The storage includes one or multiple program code snippets. After being installed, the program code snippets may be executed by the processor 110 to implement the following control method.

In this embodiment, the artificial intelligence model 100B is, for example, a chatbot with a machine learning algorithm. The chatbot is, for example, any pre-trained chatbot such as a chat generative pre-trained transformer (ChatGPT), Microsoft Bing, Google Bard, or ERNIE Bot, or a dedicated chatbot trained with domain-specific data. The artificial intelligence model 100B may be configured to execute recognition of input image files, natural language processing (NLP), natural language processing and understanding, dialogue management, speech-to-text, text-to-speech, etc. In this embodiment, the artificial intelligence model 100B is disposed in a cloud server different from the display apparatus 100A. The artificial intelligence model 100B and the display apparatus 100A communicate in wired and/or wireless communication manners. The cloud server includes a processor (or processors), a communication equipment, and a storage. The storage is, for example, configured to store the chatbot with the machine learning algorithm. The processor is, for example, configured to execute the algorithm described above. The communication equipment is configured to communicate with the display apparatus 100A. In other embodiments, the artificial intelligence model 100B may also be disposed in the display apparatus 100A.

The imaging apparatus 100C is, for example, a video camera, a camera, etc. adopting a charge coupled device (CCD) lens or a complementary metal oxide semiconductor transistors (CMOS) lens. In an embodiment, the imaging apparatus 100C may be integrally provided with the display apparatus 100A or built into the display apparatus 100A. In another embodiment, the imaging apparatus 100C is, for example, disposed separately from the display apparatus 100A. The imaging apparatus 100C is, for example, disposed adjacent to a position of a display panel of the display apparatus 100A. The imaging apparatus 100C may be, for example, a camera, a monitor, etc. disposed at a location of the display apparatus 100A.

Figure 2:
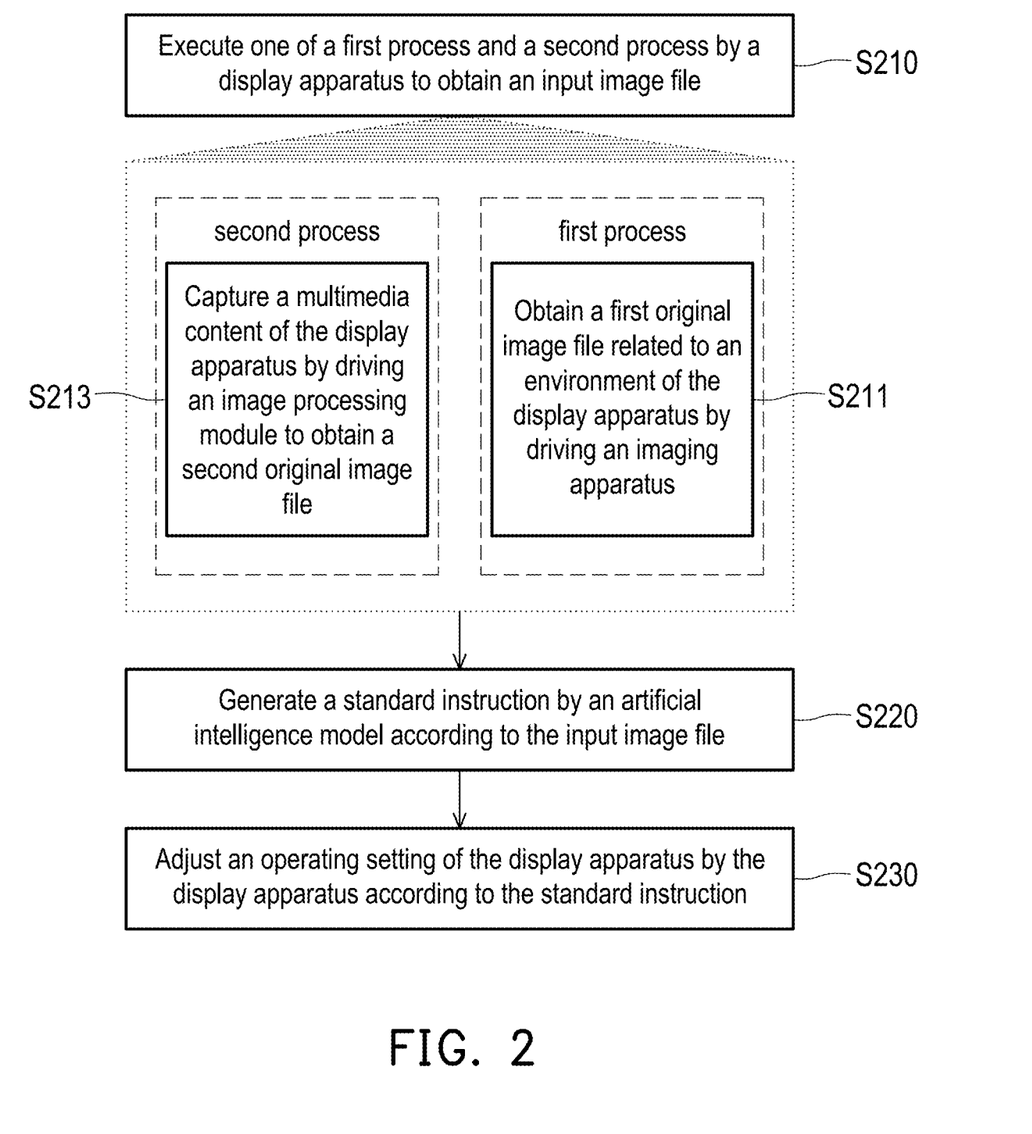
FIG. 2 is a flow chart of a control method of a display apparatus according to an embodiment of the disclosure.

FIG. 2 is a flow chart of a control method of a display apparatus according to an embodiment of the disclosure. Referring to FIG. 1 and FIG. 2, in step S210, the display apparatus 100A executes one of a first process and a second process to obtain the input image file. The input image file may include, for example, pixel data and image information. The first process includes step S211. In step S211, the processor 110 obtains a first original image file related to an environment of the display apparatus 100A by driving the imaging apparatus 100C (the imaging apparatus 100C captures a first original image, and the processor 110 obtains the first original image file through the imaging apparatus 100C), and the first original image file is used as the input image file. The second process includes step S213. In step S213, a multimedia content of the display apparatus 100A is captured by driving the image processing module 120 to obtain a second original image file, and the second original image file is used as the input image file.

The second original image file may be obtained by the image processing module 120 capturing the multimedia content currently displayed or projected by the display apparatus 100A. For example, the second original image file is captured from a display image where the display apparatus 100A plays the multimedia content or the second original image file is captured from a projection image where the display apparatus 100A projects the multimedia content. Alternatively, the second original image file may also be obtained by the image processing module 120 capturing the multimedia content that has not yet been displayed or not yet projected recorded in the display apparatus 100A. For example, when the display apparatus 100A plays or projects the multimedia content, the second original image file is captured from the multimedia content that has not yet been played or projected.

After the input image file is obtained, in step S220, the artificial intelligence model 100B generates a standard instruction according to the input image file. The artificial intelligence model 100B generates the standard instruction according to a rule instruction and the input image file. The rule instruction is configured to inform the artificial intelligence model 100B operations currently supported by the display apparatus 100A and the range of each of the operations. The rule instruction may include multiple operations executable by the display apparatus 100A and the corresponding range of each of the operations. Different models of the display apparatus 100A may have different rule instructions. The operations executable by the display apparatus 100A include adjusting any combination of a display mode, a brightness, a volume, a background color, a contrast, a variable refresh rate (VRR), and other operations executable by the display apparatus 100A.

The standard instruction generated by the artificial intelligence model 100B may correspond to an operating setting of the display apparatus 100A. The operating setting is, for example, the selection (setting) of the display mode, the selection (setting) of the background color of a display or projection target, the selection (setting) of the contrast, the selection (setting) of the brightness, the selection (setting) of the volume, a switch of the VRR, etc. The selectable (setting) range of the display modes includes, for example, education, movie, game, presentation, or other appropriate modes. The selectable (setting) range of the background colors includes, for example, white, green, yellow, pink, or other suitable colors. The adjustable range of the contrast is, for example, 0 to 10 levels. The adjustable range of the brightness is, for example, 0 to 10 levels. The adjustable range of the volume is, for example, 0 to 30 levels. The adjustable range (options) of the VRR is, for example, on and off.

The rule instruction further includes an instruction configured to instruct the artificial intelligence model 100B to analyze the input image file to obtain the environment corresponding to the first original image file or the multimedia type corresponding to the second original image file, so that the artificial intelligence model 100B analyzes the operating setting that needs to be adjusted by the display apparatus 100A according to the environment or the multimedia type.

For example, the rule instruction is configured to request the artificial intelligence model 100B to analyze the content of the input image file with the display apparatus 100A as a role, and generate an appropriate standard instruction within the range of each of the operations supported by the display apparatus 100A. The content of the rule instruction is, for example, "You are now the display apparatus 100A. You may control the display mode of the display apparatus 100A. The selectable range of the display modes includes, for example, education, movie, game, presentation, or other appropriate modes. You may also control the background color of the display apparatus 100A. The selectable range of the background colors includes, for example, white, green, yellow, pink, or other suitable colors. You may also control the brightness displayed by the display apparatus 100A. The adjustable range of the brightness is, for example, 0 to 10 levels. You may also control the volume of the display apparatus 100A. The adjustable range of the volume is, for example, 0 to 30 levels. Please analyze the content of the input image file, then recognize the environment of the input image file or the multimedia type played, and send back the standard instruction and/or a feedback message of the display mode, the background color, the brightness, and the volume suitable for the display apparatus 100A in the environment or of the multimedia type."

In step S230, the display apparatus 100A adjusts the operating setting of the display apparatus 100A according to the standard instruction. The operating setting includes at least one operation recorded in the rule instruction. The artificial intelligence model 100B analyzes the environment of the display apparatus 100A and/or the multimedia type of the multimedia content presented, provides a result of a comprehensive usage scenario analysis, and determines which operations of the display apparatus 100A need to be adjusted in this usage scenario, so that the display apparatus 100A automatically adjusts to an appropriate setting value to reduce a burden of a user in operation and provide the best viewing experience.

Figure 3:
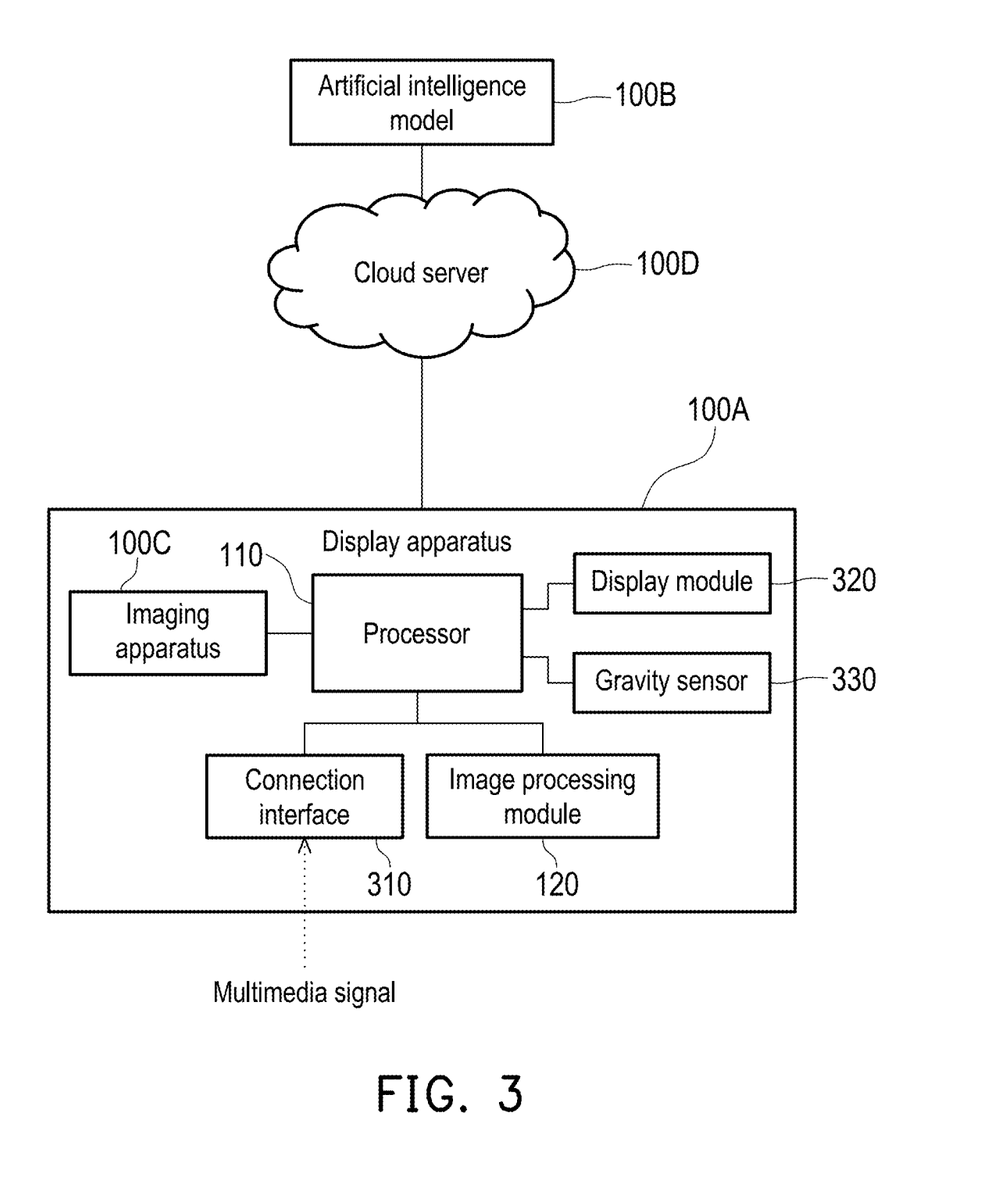
FIG. 3 is a schematic diagram of a display system according to another embodiment of the disclosure.

FIG. 3 is a schematic diagram of a display system according to another embodiment of the disclosure. Referring to FIG. 3, the display system 100 further includes a cloud server 100D, and the display apparatus 100A further includes a connection interface 310, a display module 320, and a gravity sensor 330.

The cloud server 100D includes the processor(s), the communication equipment, and the storage. The storage is, for example, configured to store one or multiple program code snippets. The processor is, for example, configured to execute one or multiple program code snippets. The communication equipment is configured to communicate with the display apparatus 100A and the artificial intelligence model 100B. In this embodiment, the display apparatus 100A, the artificial intelligence model 100B, and the cloud server 100D are implemented by three independent hardware equipment. In other embodiments, the artificial intelligence model 100B may also be disposed in the cloud server 100D. Alternatively, the display apparatus 100A and the cloud server 100D may be integrated into one hardware equipment.

The connection interface 310 may be implemented by adopting a Bluetooth (BT) connector, a high definition multimedia interface (HDMI) port, a universal serial bus (USB), etc. The display apparatus 100A receives a multimedia signal from an external electronic apparatus via the connection interface 310.

The display apparatus 100A may further include the communication equipment configured to communicate with the artificial intelligence model 100B and the cloud server 100D. The connection interface 310 may also be connected to the communication equipment to receive the multimedia signal through a network. The communication equipment may be a chip or a circuit adopting local area network (LAN) technology, wireless LAN (WLAN) technology, or mobile communication technology. The LAN is, for example, Ethernet. The WLAN is, for example, Wi-Fi. The mobile communication technology is, for example, global system for mobile communications (GSM), third-generation (3G) mobile communication technology, fourth-generation (4G) mobile communication technology, fifth-generation (5G) mobile communication technology, etc.

The display module 320 may be implemented by adopting a display panel of a display such as a projection module (for example, elements including an imaging component, a projection lens, a light source, and an optical component transmitting a light beam), an interactive flat panel (IFP), or a touch display. The multimedia content corresponding to the multimedia signal is displayed (presented) via the display module 320.

The gravity sensor 330 is coupled to the processor 110 and is configured to assist the processor 110 in determining whether a position of the display apparatus 100A is moved. The gravity sensor 330 may also be a gyroscope, an acceleration sensor, or other suitable sensors.

Figure 4:
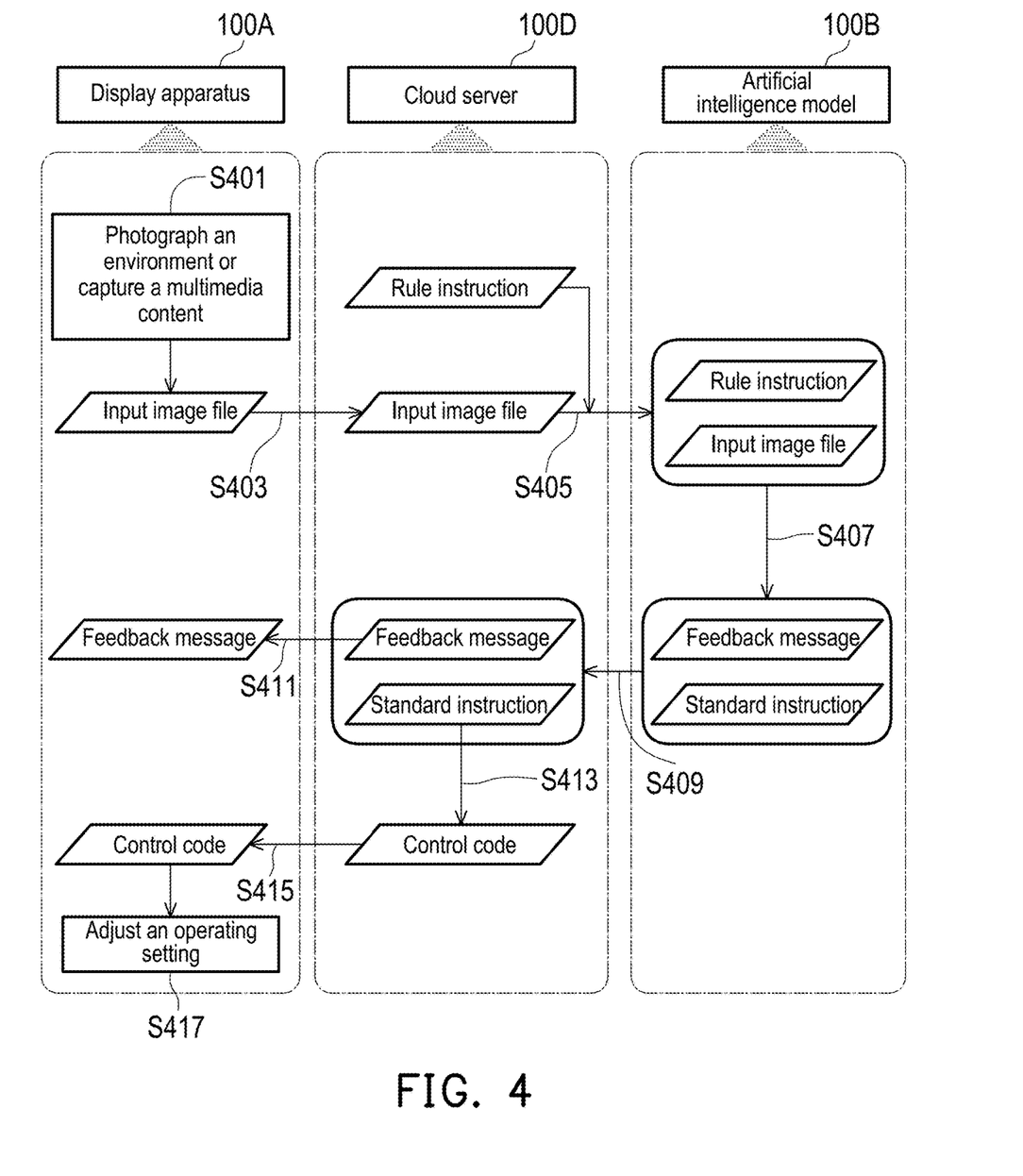
FIG. 4 is a flow chart of a control method of a display apparatus according to another embodiment of the disclosure.

FIG. 4 is a flow chart of a control method of a display apparatus according to another embodiment of the disclosure. Referring to FIG. 4, in step S401, the display apparatus 100A obtains the input image file by photographing the environment via the imaging apparatus 100C or capturing the multimedia content via the image processing module 120. That is, the processor 110 executes the first process or the second process to obtain the input image file.

A timing for executing the first process may be, for example, triggering the imaging apparatus 100C when the display apparatus 100A is turned on or detecting whether the display apparatus 100A is moved through the gravity sensor 330, and triggering the imaging apparatus 100C when the display apparatus 100A is moved and then placed stably.

When the display apparatus 100A is turned on, the processor 110 drives the imaging apparatus 100C to capture an image so as to obtain the first original image file (for example, including an overall space, a projection surface, or a display surface) related to the environment of the display apparatus 100A. Alternatively, the processor 110 detects whether the position of the display apparatus 100A is moved through the gravity sensor 330. In response to the gravity sensor 330 detecting that the position of the display apparatus 100A is moved, the processor 110 drives the imaging apparatus 100C to obtain the first original image file related to the environment of the display apparatus 100A.

A timing for executing the second process may be, for example triggering the image processing module 120 to capture the image when the multimedia signal is received via the connection interface 310 or triggering image processing module 120 to capture the image file when an input of the connection interface 310 switches from one multimedia signal to another multimedia signal.

The processor 110 determines whether the multimedia signal corresponding to the multimedia content is received via the connection interface 310 by monitoring the connection interface 310. In response to determining that the multimedia signal is received, the processor 110 drives the image processing module 120 to capture the multimedia content displayed by the display apparatus 100A to obtain the second original image file. Alternatively, the processor 110 drives the image processing module 120 to capture the multimedia content that has not yet been displayed by the display apparatus 100A to obtain the second original image file.

The processor 110 may further determine whether the input of the connection interface 310 is switched to another multimedia signal corresponding to another multimedia content by monitoring the connection interface 310. In response to determining that the input of the connection interface 310 is switched to another multimedia signal, the processor 110 drives the image processing module 120 to capture another multimedia content displayed by the display apparatus 100A to obtain a third original image file, and the third original image file is used as the input image file. Alternatively, the processor 110 drives the image processing module 120 to capture another multimedia content that has not yet been displayed by the display apparatus 100A to obtain the third original image file.

When the display apparatus 100A displays the multimedia content, the user may also actively activate a screenshot function by a remote control operation or a voice control to obtain the input image file.

After the input image file is obtained, in step S403, the display apparatus 100A transmits the input image file to the cloud server 100D. Next, in the cloud server 100D, in response to receiving the input image file from the display apparatus 100A, in step S405, the cloud server 100D transmits the input image file and the rule instruction to the artificial intelligence model 100B. Here, the cloud server 100D is pre-stored with the rule instruction. For example, the display apparatus 100A may transmit the rule instruction to the cloud server 100D in advance. Alternatively, the user may also upload the rule instruction corresponding to the display apparatus 100A to the cloud server 100D by other electronic apparatuses.

In the artificial intelligence model 100B, in step S407, the artificial intelligence model 100B generates the standard instruction according to the rule instruction and the input image file. The rule instruction is configured to request the artificial intelligence model 100B to convert the input image file into the standard instruction and is configured to limit the converted standard instruction to controlling the operating setting of the display apparatus 100A. In an embodiment, the rule instruction includes multiple operations executable by the display apparatus 100A and the corresponding range of each of the operations and includes the instruction configured to instruct the artificial intelligence model 100B to analyze the input image file to obtain the environment corresponding to the first original image file or the multimedia type corresponding to the second original image file.

In an embodiment, the artificial intelligence model 100B uses a model, for example, ChatGPT4 that may parse the image content. The ChatGPT4 may summarize and deduce the standard instruction to be set for the display apparatus 100A according to an object recognized by the input image file together with the limitation of the rule instruction. For example, when the artificial intelligence model 100B identifies that there is a green background color of a projection wall in the input image file, the corresponding standard instruction is "wall color=green"; when the artificial intelligence model 100B identifies that a scene corresponding to the input image file is "classroom", the corresponding standard instruction is "display mode-education"; and when the artificial intelligence model 100B identifies that the input image file corresponds to the multimedia content and the multimedia type is "movie", the corresponding standard instruction is "display mode=movie". The rule instruction may request the artificial intelligence model 100B to recognize the input image file and then summarize the corresponding usage scenario (the scene or the multimedia type) to generate one or multiple standard instructions based on the usage scenario, thereby achieving a purpose of controlling the operating setting of the display apparatus 100A according to the usage scenario.

In a process of parsing the input image file, the artificial intelligence model 100B may parse the image information of the input image file, thereby determining whether the input image file is obtained by the imaging apparatus 100C or obtained by the image processing module 120. When determining that the input image file is obtained by the imaging apparatus 100C, the artificial intelligence model 100B may further determine the environment by identifying the placement position or the background of the object in the input image file. For example, when identifying that the input image file includes multiple desks and chairs, the artificial intelligence model 100B may determine that the environment is "classroom". Therefore, the standard instruction which may be provided by the artificial intelligence model 100B is, for example, "display mode-education". When determining that the input image file is obtained by the image processing module 120, the artificial intelligence model 100B may further determine the multimedia type (for example, table text, presentation, movie, dark scene game, light scene game, etc.) of the input image file by parsing brightness and darkness of an overall grayscale of the input image file, whether there are texts or strings in the input image file, etc. For example, when the overall grayscale of the input image file is darker (for example, an average grayscale value is less than a preset grayscale value), the artificial intelligence model 100B determines that the multimedia type is a horror movie. At this time, the standard instruction which may be provided by the artificial intelligence model 100B is, for example, "display mode=movie". Alternatively, when the overall grayscale of the input image file is brighter, the artificial intelligence model 100B determines that the multimedia type is a presentation. At this time, the standard instruction which may be provided by the artificial intelligence model 100B is, for example, "display mode=presentation".

In step S407, the artificial intelligence model 100B may further generate a corresponding feedback message. For example, the feedback message may be configured to inform the user of the current location, and the standard instruction may be configured to indicate which operating settings need to be adjusted. Different from the prior art, the operating setting of the display apparatus 100A is determined by the artificial intelligence model 100B according to the information obtained after recognizing the input image file, rather than a pre-established fixed instruction or a parameter table, so controlling the display apparatus 100A is more flexible. Here, the artificial intelligence model 100B is not limited to providing the feedback message and may be adjusted according to the usage condition.

In step S409, the artificial intelligence model 100B transmits the standard instruction and the feedback message to the cloud server 100D. In response to receiving the feedback message from the artificial intelligence model 100B, in step S411, the cloud server 100D transmits the feedback message to the display apparatus 100A, so that the display apparatus 100A presents the feedback message in the form of visual presentation by the display module 320. Alternatively, in other embodiments, the display apparatus 100A may also present the feedback message in the form of voice output via a speaker. For example, the cloud server 100D or the display apparatus 100A may convert the text feedback message into the voice feedback message, and then play the voice feedback message via the speaker of the display apparatus 100A.

In response to receiving the standard instruction from the artificial intelligence model 100B, the cloud server 100D converts the standard instruction into a control code in step S413, and transmits the control code to the display apparatus 100A in step S415. For example, the cloud server 100D converts the standard instruction into the control code according to an instruction protocol format which may be received by the display apparatus 100A, and then transmits the control code to the display apparatus 100A. In other embodiments, the display apparatus 100A may also convert the standard instruction into the control code according to the instruction protocol format executable by the display apparatus 100A. Each different model of the display apparatus 100A has a different control code.

In step S417, the display apparatus 100A executes the control code to adjust the operating setting of the display apparatus 100A. For example, a parameter setting of the display mode is further switched to "classroom" by the processor 110 according to the environment of "classroom", and the processor 110 further automatically adjusts a parameter value of at least one of the brightness, the volume, the background color, the contrast, and the VRR according to the range instructed by the standard instruction. For example, the processor 110 may control a light source intensity of the light source of the projection module, an output power of the speaker, etc. by the control code.

Figure 5:
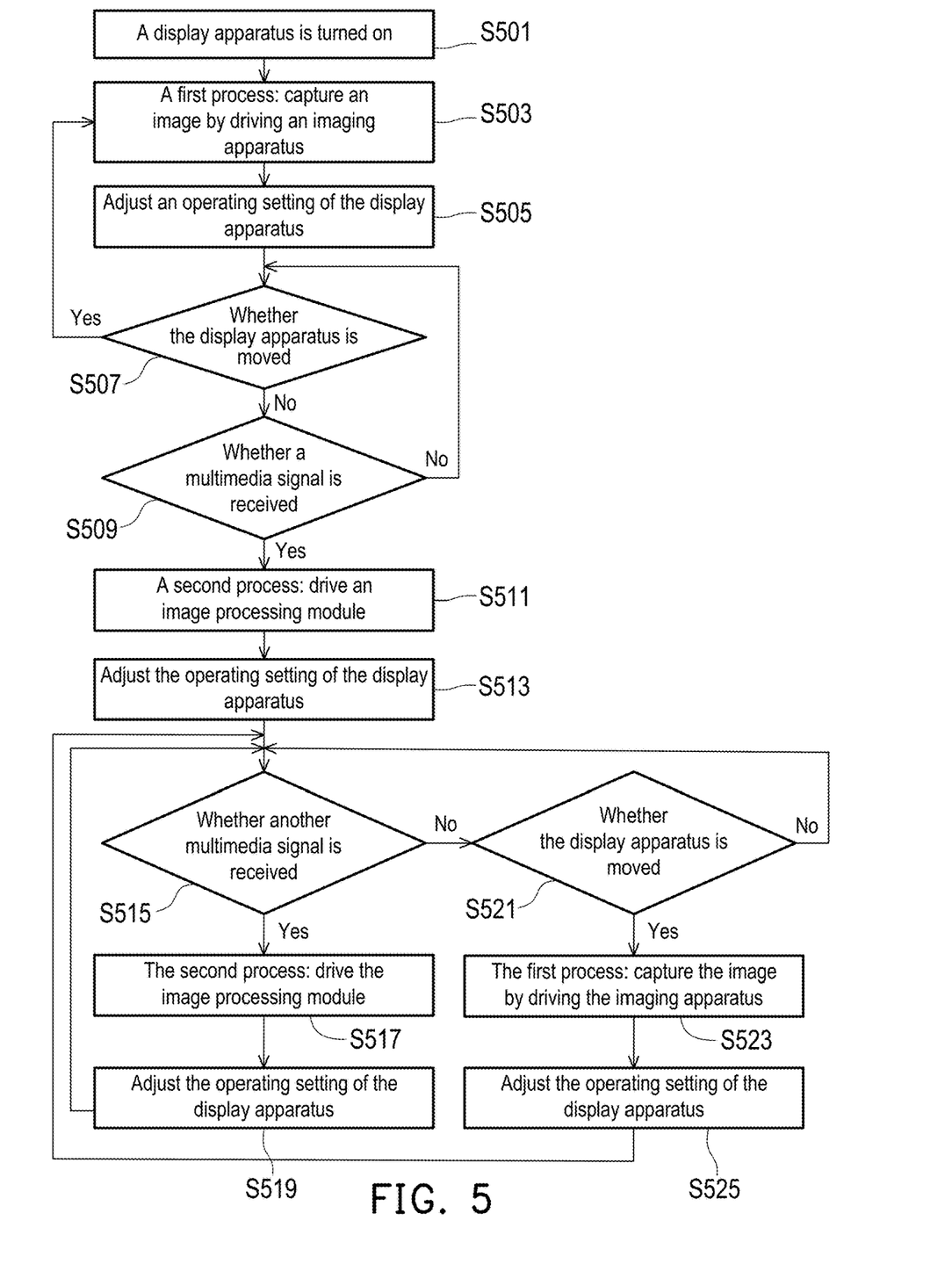
FIG. 5 is a flow chart of a control method of a display apparatus according to another embodiment of the disclosure.

FIG. 5 is a flow chart of a control method of a display apparatus according to another embodiment of the disclosure. Referring to FIG. 5, in step S501, the display apparatus 100A is turned on. Next, in step S503, the processor 110 of the display apparatus 100A executes the first process and drives the imaging apparatus 100C to capture the image to obtain the input image file. Afterwards, the artificial intelligence model 100B obtains the standard instruction according to the input image file. Then, in step S505, the processor 110 adjusts the operating setting of the display apparatus 100A according to the standard instruction.

In step S507, the processor 110 determines whether the position of the display apparatus 100A is moved through the gravity sensor 330. If the processor 110 determines that the position of the display apparatus 100A is moved, return to step S503, and the processor 110 executes the first process. If the processor 110 determines that the position of the display apparatus 100A is not moved, in step S509, the processor 110 determines whether the multimedia signal is received via the connection interface 310 by monitoring the connection interface 310.

If the processor 110 determines that the multimedia signal is not received, return to step S507. If the processor 110 determines that the multimedia signal is received, in step S511, the processor 110 executes the second process to drive the image processing module 120 to obtain the input image file in the corresponding multimedia content. Afterwards, the artificial intelligence model 100B obtains the standard instruction according to the input image file. In step S511, the processor 110 adjusts the operating setting of the display apparatus 100A according to the standard instruction.

In step S515, the processor 110 determines whether another multimedia signal is received by monitoring the connection interface 310. If the processor 110 determines that another multimedia signal is not received and the multimedia content corresponding to the previously received multimedia signal continues to be displayed, in step S521, the processor 110 may determine whether the position of the display apparatus 100A is moved through the gravity sensor 330. If the processor 110 determines that the position of the display apparatus 100A is not moved, return to step S515. If the processor 110 determines that the position of the display apparatus 100A is moved, step S523 and step S525 (the same as step S503 and step S505) are executed, and then return to step S515.

If the processor 110 determines that another multimedia signal is received, it means that an input source is changed, the processor 110 step S517 is executed to re-capture the input image file in another corresponding multimedia content, so that the artificial intelligence model 100B regenerates the standard instruction and provides the standard instruction to the display apparatus 100A. In step S519, the processor 110 adjusts the operating setting of the display apparatus 100A according to the standard instruction. Then, return to step S515, and this process is terminated until the display apparatus 100A is shut down (turned off).

The display apparatus 100A may further provide a manual adjustment mechanism. The display apparatus 100A generates an adjustment instruction according to a user input, adjusts the operating setting of the display apparatus 100A, and transmits the adjustment instruction to the cloud server 100D. Afterwards, the cloud server 100D updates the rule instruction according to the adjustment instruction to generate an updated rule instruction. For example, after the display apparatus 100A automatically adjusts the operating setting, the user may further adjust other parameter values or functions, and the processor 110 records the parameter values or the functions adjusted by the user as adjustment data, and transmits the adjustment data to the cloud server 100D. The adjustment data may be used as a user personalized message for the display apparatus 100A. The cloud server 100D may update the original rule instruction, so that the artificial intelligence model 100B may analyze the usage scenario with the updated rule instruction, thereby establishing an operating setting of a personalized usage scenario.

For example, the user may adjust the operating setting of the display apparatus 100A by the remote control operation or the voice control operation. The processor 110 further converts the control code of an adjustment item into a personalized instruction, and uploads the personalized instruction and a serial number or an identifier (identity, ID) of the display apparatus 100A to the cloud server 100D together to record a personalized preference setting of the user. The cloud server 100D generates the updated rule instruction according to the personalized instruction and the original rule instruction. The updated rule instruction may, for example, inform the artificial intelligence model 100B about the operation and the new scope currently supported by the display apparatus 100A, so that the artificial intelligence model 100B may subsequently generate the standard instruction according to the preference of the user, and the display apparatus 100A may further adjust to an appropriate parameter value according to the preference of the user. In an embodiment, the step of converting the control code of the adjustment item into the personalized instruction may also be executed by the cloud server 100D. In this embodiment, a control process with a user feedback mechanism may be established by the process described above. When the user operates a control of an on-screen display (OSD) of the display apparatus 100A, a confirmation option may be added to interact with the user in the form of question-and-answer, allowing the user to decide whether to execute the operating setting of the display apparatus 100A and store the operating setting as user personalized information. The interaction result may be regarded as a determination on whether to update the rule instruction.

In summary, the artificial intelligence image analysis technology of the disclosure analyzes how to adjust the operating setting in various different usage scenarios of the display apparatus to comply with the display environment of the usage scenario. For example, when the display apparatus is used in the classroom, the display mode, the background color of the projection wall, and the volume are automatically set. The user does not need to learn the knowledge related to the display apparatus and operating the control function of the display apparatus. After simplifying the operation steps, the user may have the best viewing effect. By the user feedback mechanism, the feedback data may be recorded by the cloud server and is configured to update the rule instruction, thereby establishing the personalized usage scenario.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A control method of a display apparatus, comprising:
executing one of a first process and a second process by the display apparatus to obtain an input image file;
generating a standard instruction by an artificial intelligence model according to the input image file; and
adjusting an operating setting of the display apparatus by the display apparatus according to the standard instruction,
wherein the first process comprises:
detecting whether a position of the display apparatus is moved through a gravity sensor of the display apparatus; and
in response to the gravity sensor detecting that the position of the display apparatus is moved, obtaining a first original image file related to an environment of the display apparatus by driving an imaging apparatus, and using the first original image file as the input image file; and
wherein the second process comprises:
capturing a multimedia content of the display apparatus by driving an image processing module to obtain a second original image file, and using the second original image file as the input image file.

2. The control method according to claim 1, wherein the step of generating the standard instruction by the artificial intelligence model according to the input image file comprises:
generating the standard instruction by the artificial intelligence model according to a rule instruction and the input image file, wherein the rule instruction comprises a plurality of operations executable by the display apparatus and a corresponding range of each of the plurality of operations, and the operating setting comprises at least one of the plurality of operations.

3. The control method according to claim 2, wherein the rule instruction further comprises an instruction configured to instruct the artificial intelligence model to analyze the input image file to obtain the environment corresponding to the first original image file or a multimedia type corresponding to the second original image file, so that the artificial intelligence model analyzes the operating setting that needs to be adjusted by the display apparatus according to the environment or the multimedia type.

4. The control method according to claim 2, further comprising executing following steps by a cloud server:
in response to receiving the input image file from the display apparatus, transmitting the input image file and the rule instruction to the artificial intelligence model; and
in response to receiving the rule instruction from the artificial intelligence model, converting the rule instruction into a control code, and transmitting the control code to the display apparatus, so that the display apparatus executes the control code to adjust the operating setting of the display apparatus.

5. The control method according to claim 4, further comprising executing following steps by the cloud server:
receiving the standard instruction and a feedback message from the artificial intelligence model, and transmitting the feedback message to the display apparatus, so that the display apparatus presents the feedback message through at least one of a display module and a speaker.

6. The control method according to claim 4, further comprising:
generating an adjustment instruction according to a user input, adjusting the operating setting of the display apparatus, and transmitting the adjustment instruction to the cloud server by the display apparatus; and
updating the rule instruction by the cloud server according to the adjustment instruction to generate an updated rule instruction.

7. The control method according to claim 2, wherein the plurality of operations executable by the display apparatus comprises adjusting any combination of a display mode, a brightness, a volume, a background color, a contrast, and a variable refresh rate.

8. The control method according to claim 1, wherein the second process further comprises:
determining whether a multimedia signal corresponding to the multimedia content is received by a connection interface of the display apparatus by monitoring the connection interface; and
in response to determining that the multimedia signal is received, executing following steps:
capturing the multimedia content of the display apparatus by driving the image processing module to obtain the second original image file;
determining whether an input of the connection interface is switched to another multimedia signal corresponding to another multimedia content by monitoring the connection interface; and
in response to determining that the input of the connection interface is switched to the another multimedia signal, capturing the another multimedia content of the display apparatus by driving the image processing module to obtain a third original image file, and using the third original image file as the input image file.

9. A display system, comprising an imaging apparatus, a display apparatus, and an artificial intelligence model, wherein:
the imaging apparatus is configured to obtain a first original image file related to an environment of the display apparatus;
the display apparatus is coupled to the artificial intelligence model, wherein the display apparatus comprises:
an image processing module, configured to capture a multimedia content of the display apparatus to obtain a second original image file;
a gravity sensor, configured to detect whether a position of the display apparatus is moved, wherein in response to the gravity sensor detecting that the position of the display apparatus is moved, the imaging apparatus is driven to obtain the first original image file related to the environment of the display apparatus; and
a processor, coupled to the imaging apparatus and the image processing module, wherein the processor is configured to:
use the first original image file from the imaging apparatus or the second original image file from the image processing module as an input image file; and
adjust an operating setting of the display apparatus according to a standard instruction from the artificial intelligence model; and
the artificial intelligence model is configured to: generate the standard instruction according to the input image file.

10. The display system according to claim 9, wherein the artificial intelligence model is configured to:
generate the standard instruction according to a rule instruction and the input image file, wherein the rule instruction comprises a plurality of operations executable by the display apparatus and a corresponding range of each of the plurality of operations, and the operating setting comprises at least one of the plurality of operations.

11. The display system according to claim 10, wherein the rule instruction further comprises an instruction configured to instruct the artificial intelligence model to analyze the input image file to obtain the environment corresponding to the first original image file or a multimedia type corresponding to the second original image file, so that the artificial intelligence model analyzes the operating setting that needs to be adjusted by the display apparatus according to the environment or the multimedia type.

12. The display system according to claim 10, further comprising: a cloud server coupled to the display apparatus and the artificial intelligence model, wherein the cloud server is configured to:
in response to receiving the input image file from the display apparatus, transmit the input image file and the rule instruction to the artificial intelligence model; and
in response to receiving the rule instruction from the intelligence model, convert the rule instruction into a control code, and transmit the control code to the display apparatus, so that the display apparatus executes the control code to adjust the operating setting of the display apparatus.

13. The display system according to claim 12, wherein the cloud server is configured to:
receive the standard instruction and a feedback message from the artificial intelligence model, and transmit the feedback message to the display apparatus, so that the display apparatus presents the feedback message through at least one of a display module and a speaker.

14. The display system according to claim 12, wherein the display apparatus is configured to: generate an adjustment instruction by the processor, adjust the operating setting of the display apparatus, and transmit the adjustment instruction to the cloud server, wherein the cloud server is configured to: update the rule instruction according to the adjustment instruction to generate an updated rule instruction.

15. The display system according to claim 10, wherein the plurality of operations executable by the display apparatus comprises adjusting any combination of a display mode, a brightness, a volume, a background color, a contrast, and a variable refresh rate.

16. The display system according to claim 9, wherein the display apparatus further comprises a connection interface coupled to the processor, the processor is configured to:

determine whether a multimedia signal corresponding to the multimedia content is received via the connection interface by monitoring the connection interface; and in response to determining that the multimedia content is received, the processor is further configured to:

capture the multimedia content of the display apparatus by driving the image processing module to obtain the second original image file;

determine whether an input of the connection interface is switched to another multimedia signal corresponding to another multimedia content by monitoring the connection interface; and in response to determining that the input of the connection interface is switched to the another multimedia signal, capture the another multimedia content of the display apparatus by driving the image processing module to obtain a third original image file, and use the third original image file as the input image file.

17. A display apparatus, comprising:

an imaging apparatus, configured to obtain a first original image file related to an environment of the display apparatus;

an image processing module, configured to capture a multimedia content of the display apparatus to obtain a second original image file;

a gravity sensor, configured to detect whether a position of the display apparatus is moved, wherein in response to the gravity sensor detecting that the position of the display apparatus is moved, the imaging apparatus is driven to obtain the first original image file related to the environment of the display apparatus; and a processor, coupled to the imaging apparatus and the image processing module, wherein the processor is configured to:

use the first original image file from the imaging apparatus or the second original image file from the image processing module as an input image file; and adjust an operating setting of the display apparatus according to a standard instruction corresponding to the input image file, wherein the standard instruction is generated by an artificial intelligence model according to the input image file.

* * * * *